(12) United States Patent  
Furukawa

(10) Patent No.: US 7,898,151 B2
(45) Date of Patent: Mar. 1, 2011

(54) ULTRASONIC SENSOR HAVING A PIEZOELECTRIC ELEMENT

(75) Inventor: Kenichi Furukawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 64 days.

(21) Appl. No.: 12/081,907

(22) Filed: Apr. 23, 2008

(65) Prior Publication Data

US 2008/0309199 A1    Dec. 18, 2008

(30) Foreign Application Priority Data

Jun. 12, 2007    (JP) ............................... 2007-155272

(51) Int. Cl.
    *H01L 41/053* (2006.01)
(52) U.S. Cl. ..................... 310/322; 310/348; 310/365
(58) Field of Classification Search ................. 310/322, 310/334, 335, 344, 365, 366, 348
    See application file for complete search history.

(56) References Cited

U.S. PATENT DOCUMENTS 5,987,992 A * 11/1999 Watanabe et al. ............. 73/632
6,520,019 B1 * 2/2003 Schon et al. .................. 73/632
2008/0118826 A1 * 5/2008 Shimamura et al. ......... 429/129

FOREIGN PATENT DOCUMENTS

| JP | 09-284896  | 10/1997 |
| JP | 11-266498  | 9/1999  |
| JP | 2000-032594 | 1/2000 |
| JP | 2002-209294 | 7/2002 |

* cited by examiner

*Primary Examiner*—Derek J Rosenau
(74) *Attorney, Agent, or Firm*—IPUSA, PLLC

(57) ABSTRACT

An ultrasonic sensor having a piezoelectric element including first and second electrodes is disclosed. The ultrasonic sensor includes an aluminum case having a bottom part electrically contacting the second electrode of the piezoelectric element, a first conductive part electrically connected to the first electrode of the piezoelectric element, and a second conductive part having a cladding material including a material exhibiting a satisfactory welding property with respect to the aluminum case. The second conductive part and the aluminum case are welded together.

2 Claims, 6 Drawing Sheets

ULTRASONIC SENSOR HAVING A PIEZOELECTRIC ELEMENT

BACKGROUND OF THE INVENTION

1. Field of the Invention

The present invention generally relates to an ultrasonic sensor having a piezoelectric element.

2. Description of the Related Art

An ultrasonic sensor is configured to generate an ultrasonic wave and receive a part or the entire generated ultrasonic wave reflected back to the ultrasonic sensor. The ultrasonic sensor is used in, for example, an obstacle detecting system that detects an object by intermittently generating an ultrasonic wave in a particular direction(s) and receiving a part or the entire generated ultrasonic wave reflected from an obstacle situated in this direction. The ultrasonic sensor may also be used as a range finding system configured to measure the distance from a target object. The range finding system, which uses the ultrasonic wave sensor to transmit an ultrasonic wave and receive a reflected ultrasonic wave in response to the transmitted ultrasonic wave, measures the difference in time between the ultrasonic wave being transmitted and the reflected ultrasonic wave being received and calculates the distance from a target object according to the measured time difference.

FIG. 7 shows an exemplary configuration of a conventional ultrasonic sensor 10.

The ultrasonic sensor 10 mainly includes a sensor case 11, a piezoelectric element 12, a pair of terminals 13, and an acoustic material 15. The sensor case 11 is made of aluminum and has a closed-bottom cylindrical shape. A bottom part 11a of the sensor case 11 functions as a vibration plate.

The piezoelectric element 12 has an electrode formed on each its upper surface and its lower surface (hereinafter referred to as "upper electrode" and "lower electrode"). In a case where voltage is applied to this pair of electrodes, the piezoelectric element 12 generates mechanical energy (stress causing vibration or strain). In a case where mechanical energy (vibration) is applied to the piezoelectric element 12, an electrical charge is generated between the pair of electrodes. The piezoelectric element 12 is positioned at the bottom part 11a functioning as a vibration plate of the sensor case 11.

Furthermore, the upper electrode of the piezoelectric element 12 is electrically connected to one end of the terminal 13 by a wire 14. The lower electrode of the piezoelectric element 12 is electrically connected to the bottom part 11a of the sensor case 11 made of aluminum. The sensor case 11 and the other end of the terminal 13 are electrically connected by using a wiring pattern 16.

Thereby, the piezoelectric element 12 is electrically connected to the pair of terminals 13. It is to be noted that the acoustic material 15 is placed inside the sensor case 11 for preventing reflection of ultrasonic waves (See Japanese Laid-Open Patent Application Nos. 9-284896, 11-266498, 2000-32594, and 2002-209294).

The conventional ultrasonic sensor typically uses aluminum for its sensor case for creating vibration by mechanical resonance caused by the piezoelectric element. However, due to the characteristics of aluminum material, it is difficult to perform soldering on the aluminum-made sensor case and unsuitable to coat the aluminum sensor with a conductive adhesive agent because the conductive adhesive agent requires a secondary process such as curing by heat.

Therefore, in a case of connecting the aluminum case to a wire or a terminal board, there is proposed a method of providing an engagement part on the sensor case and soldering the wire or the terminal board to the aluminum case via the engagement part by using a connecting pin or a wiring pattern. However, such a method requires a step of forming the engagement part, generates costs for manufacturing the connecting pin, and is difficult to assemble.

SUMMARY OF THE INVENTION

The present invention provides an ultrasonic sensor having a piezoelectric element that substantially eliminates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an ultrasonic sensor having a piezoelectric element particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an ultrasonic sensor having a piezoelectric element including first and second electrodes, the ultrasonic sensor including an aluminum case having a bottom part electrically contacting the second electrode of the piezoelectric element, a first conductive part electrically connected to the first electrode of the piezoelectric element, a second conductive part having a cladding material including a material exhibiting a satisfactory welding property with respect to the aluminum case, wherein the second conductive part and the aluminum case are welded together.

According to another embodiment of the present invention, the cladding material may further include a material exhibiting a satisfactory soldering property.

According to another embodiment of the present invention, the cladding material may have one side formed of aluminum and the other side formed of nickel.

According to another embodiment of the present invention, the first conductive part may be formed of the same cladding material as the cladding material of the second conductive part.

According to another embodiment of the present invention, the ultrasonic sensor may further include a lead wire having one end connected to one end of the first conductive part and another end connected to the first electrode of the piezoelectric element.

Other objects and further features of the present invention will be apparent from the following detailed description when read in conjunction with the accompanying drawings.

BRIEF DESCRIPTION OF THE DRAWINGS

FIGS. 6A and 6B are schematic diagrams showing where a joining part is removed from a conductive member after a filling material is supplied into a case of an ultrasonic sensor according to an embodiment of the present invention, in which FIG. 6A is a cross-sectional view of the ultrasonic sensor taken along line A-A of FIG. 6B and FIG. 6B is a cross-sectional view of the ultrasonic sensor taken along line B-B of FIG. 6A.

DESCRIPTION OF THE PREFERRED EMBODIMENTS

In the following, embodiments of the present invention will be described with reference to the accompanying drawings.

Figure 1:
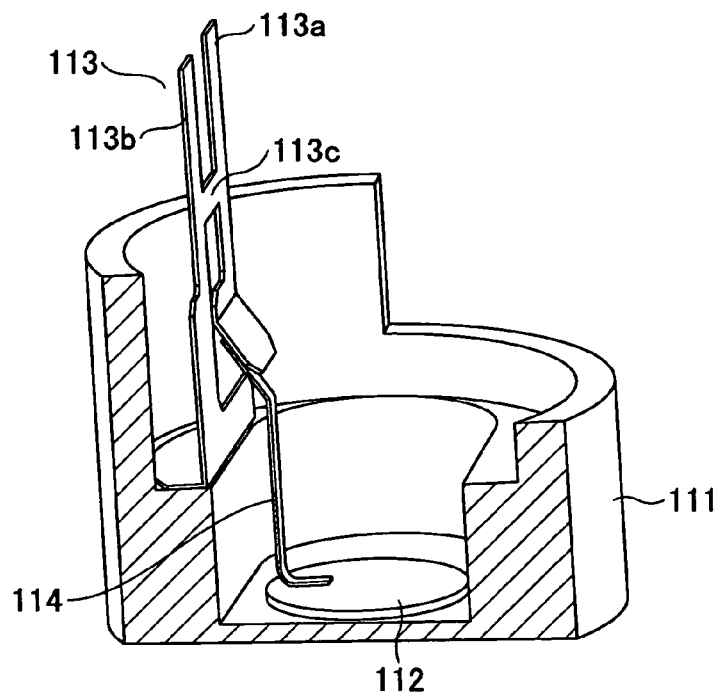
FIG. 1 is a cut-away perspective view showing an ultrasonic sensor according to an embodiment of the present invention.
Figure 2:
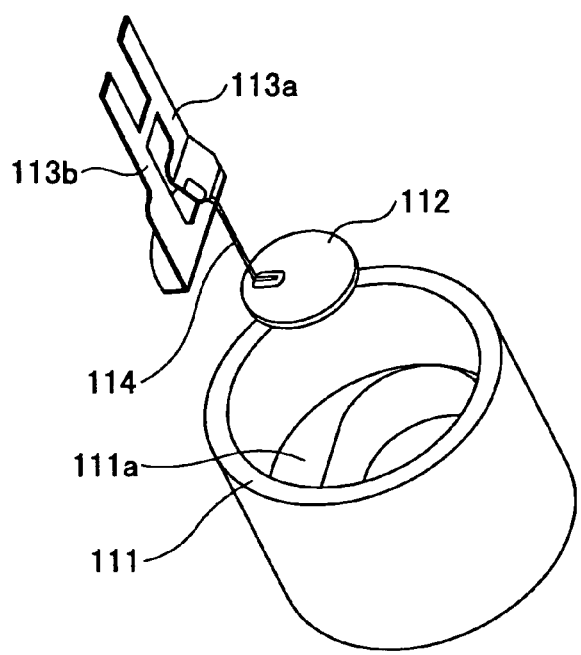
FIG. 2 is an exploded perspective view showing an ultrasonic sensor according to an embodiment of the present invention.

FIG. 1 is a cut-away perspective view showing an ultrasonic sensor 100 according to an embodiment of the present invention. FIG. 2 is an exploded perspective view showing the ultrasonic sensor 100 according to an embodiment of the present invention.

The ultrasonic sensor 100 generates an ultrasonic wave(s) for transmitting the generated ultrasonic wave(s) to the outside and receiving a part of the entire generated ultrasonic wave(s) reflected back to the ultrasonic sensor 100. The ultrasonic sensor 100 according to an embodiment of the present invention includes, for example, an aluminum case (hereinafter referred to as "case") 111, a piezoelectric element 112, a conductive member 113 having first and second conductive parts 113a, 113b, a lead wire 114, acoustic material 118 (for example, see FIG. 6B), filling material 119 (for example, see FIG. 6B), and an epoxy adhesive agent (not shown).

The case 111 is formed in a substantially cylindrical shape having an open top (open end) and a closed bottom (closed end). The ultrasonic sensor 100 generates ultrasonic waves by applying voltage to the piezoelectric element 112 and causing the piezoelectric element 112 to vibrate a bottom part 111b of the case 111, and creates electric voltage (electric signals) with the piezoelectric element 112 by applying vibrations to the piezoelectric element 112 from the bottom part 111b vibrated by reflected ultrasonic waves. Therefore, a material having good vibration characteristics is used in forming the case 111 (in this example, an aluminum material is used). As shown in FIG. 2, a step part 111a is formed at an inner peripheral part of the case 111. The step part 111a is welded to a second connection part 117a of the second conductive part 113b (described in detail below).

The piezoelectric element 112 converts between vibrations (mechanical energy) and electrical energy in the ultrasonic sensor 100. The piezoelectric element 112 is formed of a crystal(s) of a ceramic material having a ferroelectric property. The piezoelectric element 112 is fabricated by performing a poling process on the ceramic crystal(s) by coating silver electrodes onto the upper and lower surfaces of the ceramic crystal(s) and applying high voltage to the ceramic crystal(s). The piezoelectric element 112 according to an embodiment of the present invention has a first electrode 112a provided on its upper surface and a second electrode 112b provided on its lower surface.

The piezoelectric element 112 is installed in the case 111 in a manner facing the bottom surface of the case 111. When installing the piezoelectric element 112 in the case 111, the piezoelectric element 112 is fixed (e.g., adhesively fixed) to the bottom surface of the case 111. The second electrode 112b provided on the lower surface of the piezoelectric element 112 becomes electrically connected to the case 111 when the piezoelectric element 112 is installed and fixed to the bottom surface of the case 111. Furthermore, the second conductive part 113b is connected to the case 111 by welding the second connecting part 117a to the step part 111a of the case 111 (described in further detail with reference to FIGS. 4A and 4B). Thereby, the second conductive part 113b is electrically connected to the second electrode 112b provided on the lower surface of the piezoelectric element 112 via the case 111.

As described above, the ultrasonic sensor 100 generates ultrasonic waves by applying voltage to the piezoelectric element 112 and causing the piezoelectric element 112 to vibrate a bottom part 111b of the case 111, and creates electric voltage (electric signals) with the piezoelectric element 112 by applying vibration to the piezoelectric element 112 from the bottom part 111b vibrated by reflected ultrasonic waves.

One end of the lead wire 114 is connected to the first electrode 112a provided on the upper surface of the piezoelectric element 112 by directly soldering the one end of the lead wire 114 to the first electrode 112a provided on the upper surface of the piezoelectric element 112 or by using a conductive adhesive agent. Furthermore, the other end of the lead wire 114 is connected to the first conductive part 113a, for example, by soldering the other end of the lead wire 114 to a side (second metal part) 115b of the first conductive part 113a (described in detail below with reference to FIG. 3).

Next, the conductive member 113 is described.

The conductive member 113 is an input/output terminal of the ultrasonic sensor 100 for inputting signals to the ultrasonic sensor 100 and outputting signals from the ultrasonic sensor 100. The conductive member 113 is conductive with respect to the first and second electrodes 112a, 112b provided on the upper and lower surfaces of the piezoelectric element 112, to thereby establish a connection with an external circuit.

The conductive member 113 includes the first conductive part 113a and the second conductive part 113b.

The first and second conductive parts 113a, 113b may be integrally formed as a united body by press-working the conductive member 113. More specifically, the conductive member 113 including the first and second conductive parts 113a, 113b is formed by, for example, punching out the conductive member 113 from a planar conductive material by using a press. The first and second conductive parts 113a, 113b according to an embodiment of the present invention are formed together with a joining part 113c that joins the first and second conductive parts 113a (for example, see FIG. 1). The joining part 113c is removed from the conductive member 113 after the filling material 119 is supplied into the case 111, to thereby separate the first conductive part 113a and the second conductive part 113b. Accordingly, the first and second conductive parts 113a, 113b can be handled as a united body until the process of supplying the filling material 119 into the case 111 is completed, to thereby facilitate manufacturing of the first and second conductive parts 113a, 113b. It is to be noted that the fabrication of the first and second conductive parts 113a, 113b is not limited to press-working the conductive member 113. For example, press-working may be performed on the first and second conductive parts 113a, 113b separately.

Figure 3:
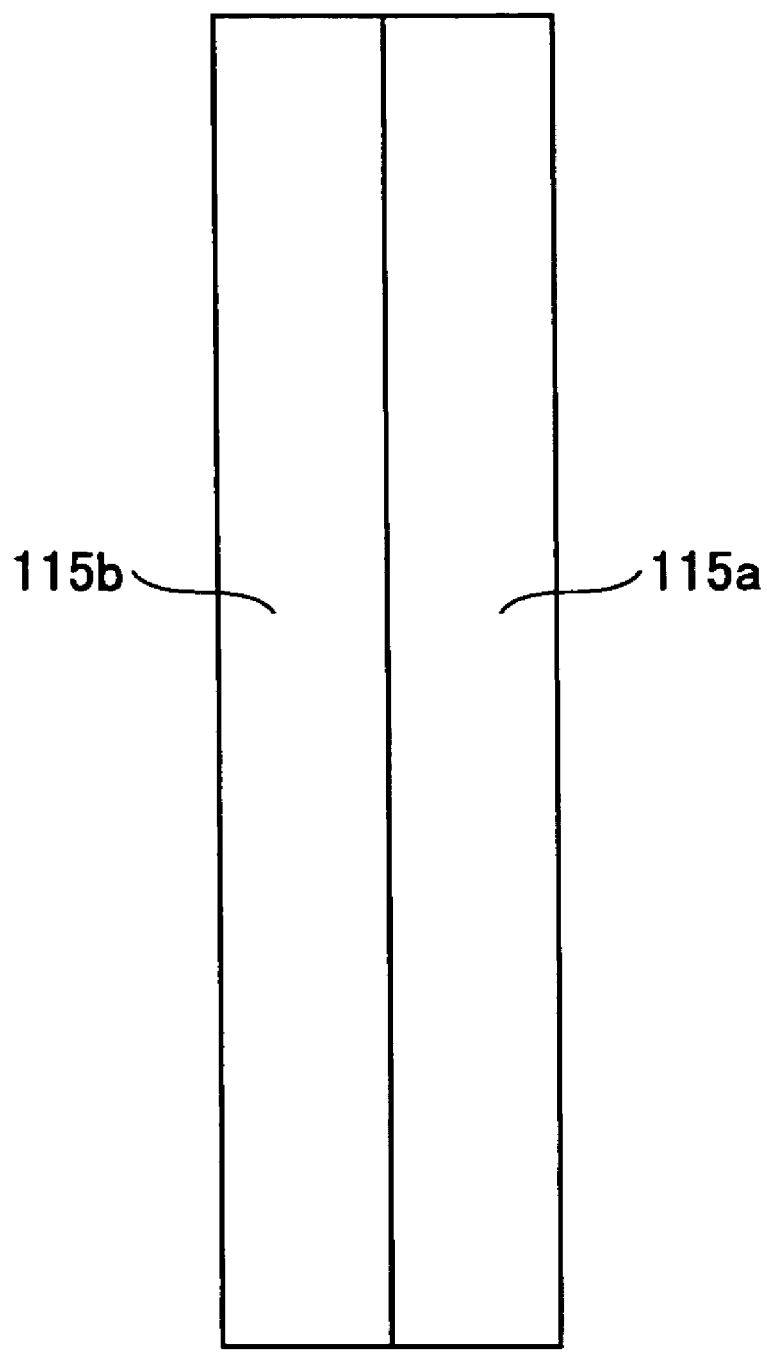
FIG. 3 is a schematic diagram showing a cladding member according to an embodiment of the present invention.

As shown in FIG. 3, the conductive member 113 according to an embodiment of the present invention is formed of a planar cladding material having a first metal part 115a on one side and a second metal part 115b on the other side. The first metal part 115a is formed of a material exhibiting a satisfactory welding property with respect to the aluminum material of the case 111. The second metal part 115b is formed of a material exhibiting a satisfactory soldering property with respect to, for example, the lead wire 114.

More specifically, according to an embodiment of the present invention, aluminum is used as the material of the first metal part 115a and nickel is used as the material of the second metal part 115b. However, as long as the first metal part 115a can be satisfactorily welded to the aluminum case 111, another material(s) may be used as the material of the first metal part 115a. Likewise, as long as the second metal part 115b can be satisfactorily soldered to, for example, the lead wire 114, another material(s) may be used as the material of the second metal part 115b. Furthermore, the number of layers of the conductive member 113 is not limited to two layers. For example, the conductive member 113 may be formed of three or more layers.

Figure 4A:
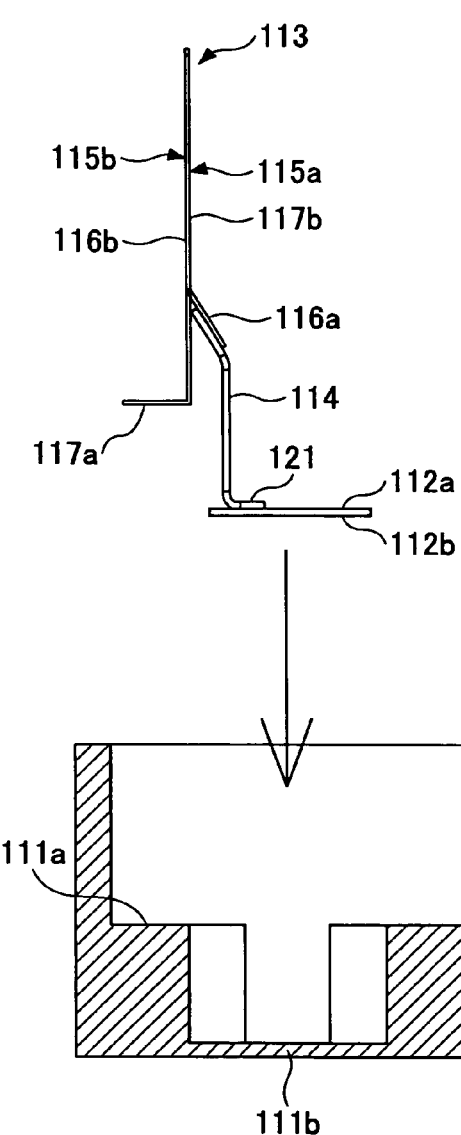
FIGS. 4A and 4B are schematic diagrams for describing an exemplary case where a piezoelectric element, a lead wire, and a conductive member are mounted in a case according to an embodiment of the present invention.
Figure 4B:
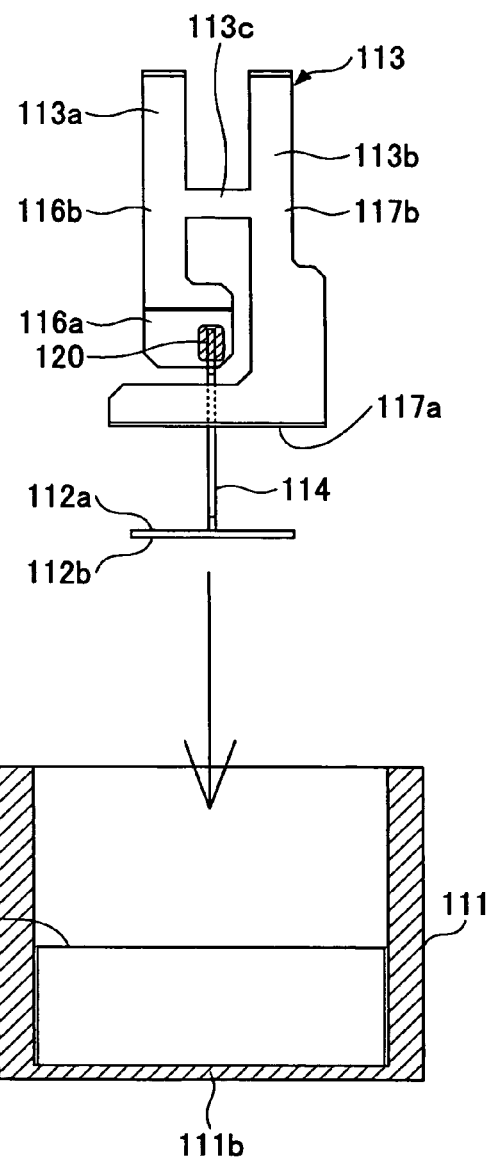

As shown in FIGS. 4A and 4B, the conductive member 113, which is formed of the cladding material, has the first conductive part 113a formed in a shape having an inclined extension (first connecting part 116a) inclined relative to a upright part (perpendicular portion 116b). That is, the first conductive part 113a includes the perpendicular portion 116b extending in a perpendicular (vertical) direction and the first connecting part 116a extending in a diagonally downward direction with respect to the perpendicular portion 116b.

Furthermore, the conductive member 113 has the second conductive part 113b formed in an L-shape. As shown in FIGS. 4A and 4B, the second conductive part 113b includes a perpendicular portion 117b extending in a perpendicular direction and the second connecting part 117a that is bent substantially 90 degrees with respect to the perpendicular portion 117b.

The conductive member 113 is fabricated so that the bottom lower side of the bent second connecting part 117a comprises the first metal part 115a made of aluminum. Therefore, as shown in FIG. 4A, the second connecting part 117 is bent in a manner where the first metal part 115a exhibiting a satisfactory welding property faces the step part 111a of the case 111 made of aluminum.

Meanwhile, as shown in FIG. 4A, the first connecting part 116a is bent in a direction opposite to the bending direction of the second connecting part 117a. Accordingly, the first connecting part 116a is bent in a manner where the second metal part 115b exhibiting a satisfactory soldering property faces the piezoelectric element 112.

As shown in FIG. 4B, an upper end part of the lead wire 114 is soldered to the second metal part 115b of the first connecting part 116a at a connection point 120. As shown in FIG. 4A, a lower end part of the lead wire 114 is soldered to the first electrode 112a of the piezoelectric element 112 at a connection point 121. Because the side of the first connecting part 116a facing the piezoelectric element 112 is the second metal part 115b formed of nickel, the lead wire 114 can be surely soldered to the first conductive part 113a formed of a cladding material.

Figure 5:
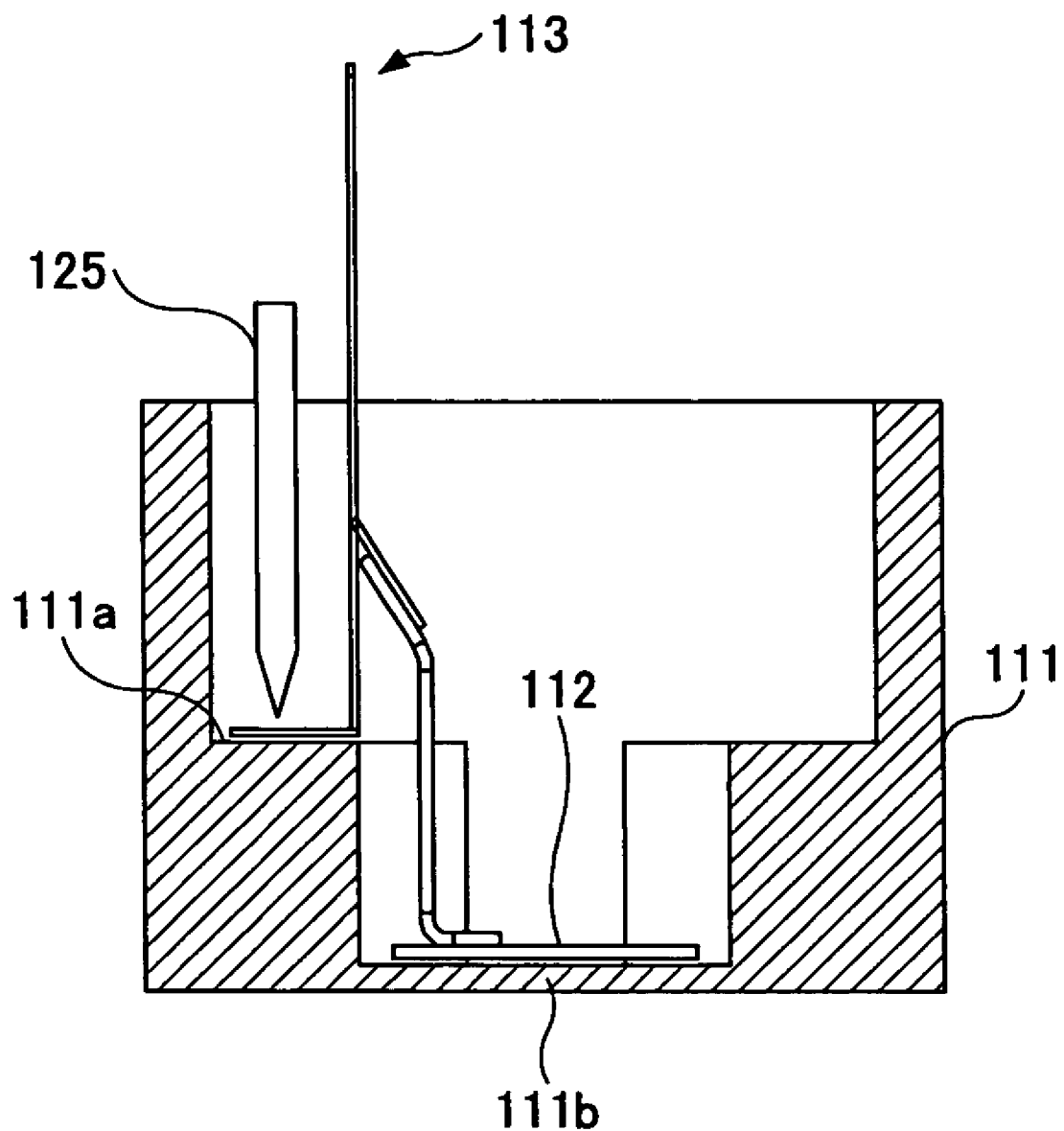
FIG. 5 is a cross-sectional view showing a conductive member and a piezoelectric element mounted in a case according to an embodiment of the present invention.
Figure 6A:
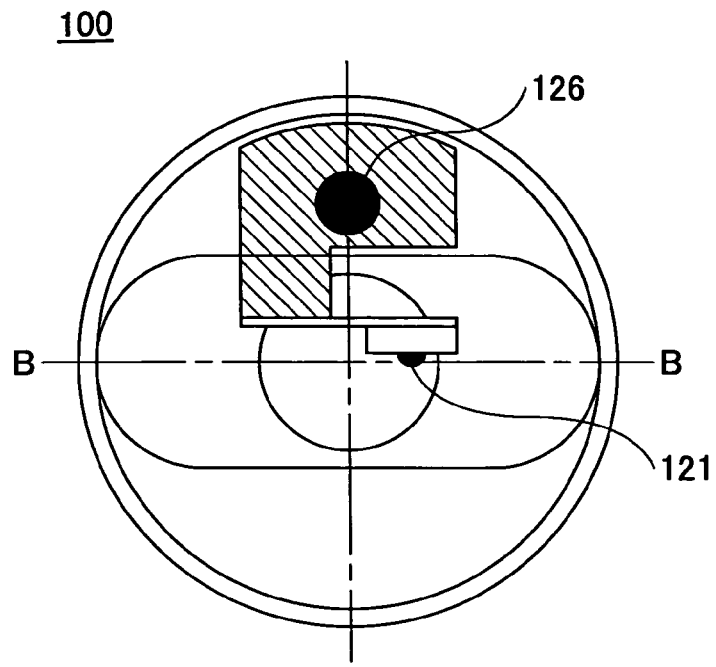

Connection between the second connecting part 117a of the second conductive part 113b and the step part 111a of the case 111 is established by welding a connection point (connection spot) 126 shown in FIG. 6A. The welding is performed, for example, by using a welding jig 125 as shown in FIG. 5. By forming the lower bottom side of the second connecting part 117a with the first metal part 115a, welding can easily be performed by positioning the second connecting part 117a into close contact with the step part 111a of the aluminum case 111. Furthermore, because the first metal part 115a is formed of the same material as the case 111, sufficient bonding strength can be obtained.

In a case of connecting the second conductive part 113b to an external circuit where the first metal part 115a made of aluminum contacts the external circuit, it would be difficult to solder the second conductive part 113b to the external circuit at the aluminum first metal part 115a because aluminum has a characteristic of being difficult to solder. Furthermore, in a case of using a connector to connect the second conductive part 113b to an external circuit, space and volume would be required for mounting the connector. Moreover, in a case where soldering is performed on aluminum, the aluminum becomes oxidized and exhibits an insulating property. Therefore, a reliable connection between the second conductive part 113b and the external circuit cannot be established.

Therefore, according to an embodiment of the present invention, the second conductive part 113b is connected to an external circuit by the second metal part 115b made of nickel exhibiting a satisfactory soldering property. Thereby, the second conductive part 113b can easily be connected to an external circuit.

Accordingly, by using a cladding material as the conductive member 113, the conductive member 113 can be easily connected to both the case 111 and the external circuit.

Figure 6B:
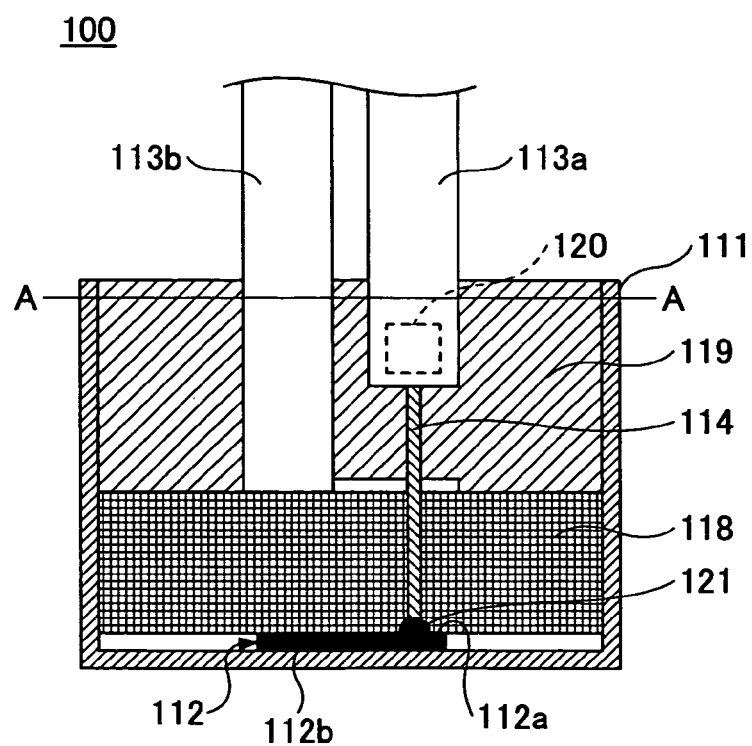
Figure 7:
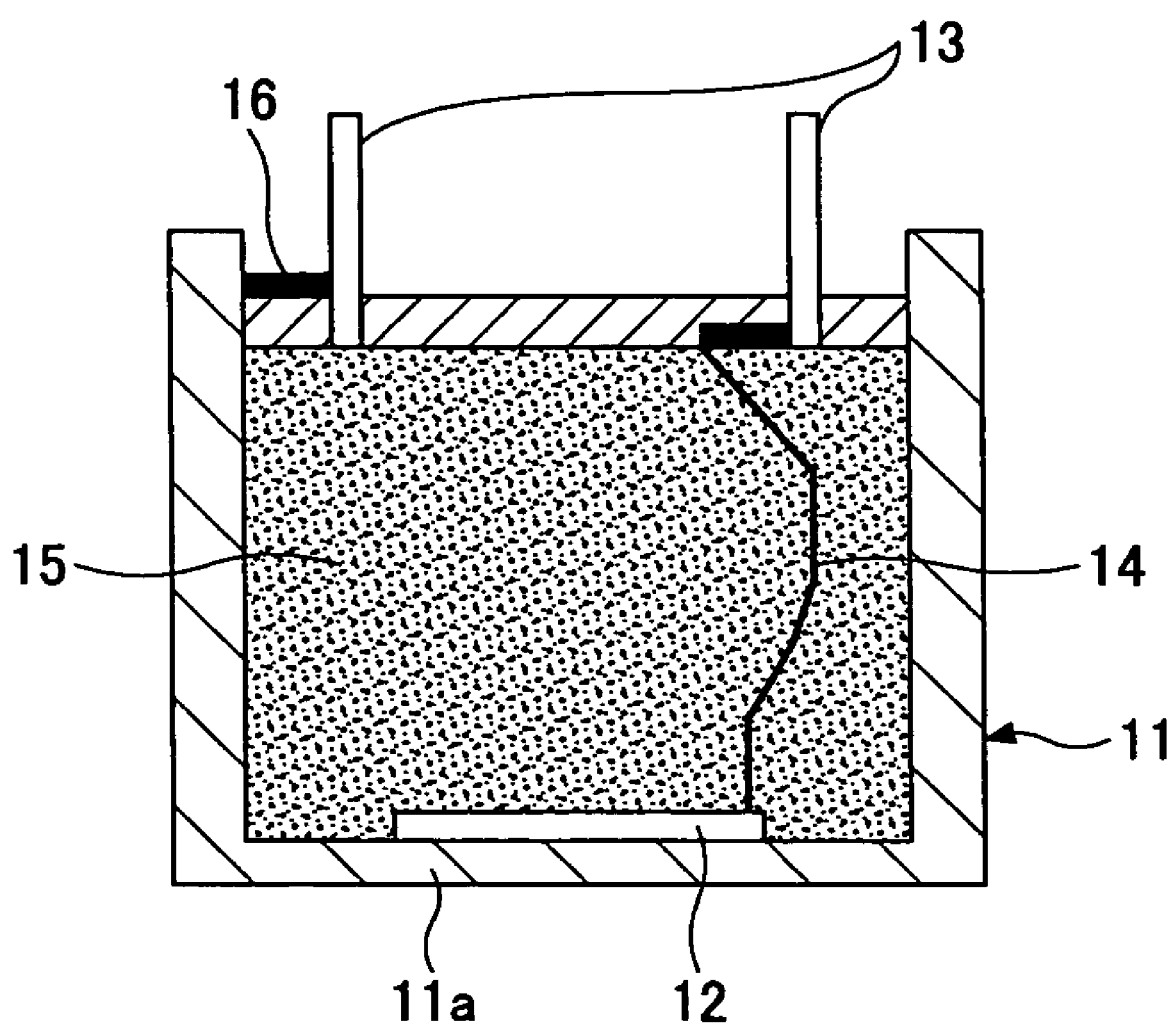
FIG. 7 is a schematic diagram showing an example of a conventional ultrasonic sensor.

FIG. 6B shows where the piezoelectric element 112 and the conductive member 113 are mounted in the case 111 when the joining part 113c is removed from the conductive member 113 after the filling material 119 is supplied into the case 111 according to an embodiment of the present invention.

The acoustic material 118 according to an embodiment of the present invention is a resin material. After the piezoelectric element 112, the conductive member 113, and the lead wire 114 are assembled and mounted into the case 111, the acoustic material 118 is placed inside the case 111. By placing the acoustic material 118 on the piezoelectric element 112, reverberation of the ultrasonic sensor 100 can be reduced and high sensitivity can be attained for the ultrasonic sensor 100.

Hence, with the above-described embodiment of the present invention, because a cladding material exhibiting a satisfactory welding property with respect to aluminum is used as the conductive member, welding performance can be improved, the number of components can be reduced, and the assembly can be simplified in fabricating an ultrasonic sensor.

Further, the present invention is not limited to these embodiments, but variations and modifications may be made without departing from the scope of the present invention.

For example, although the lead wire 114 is used for connecting the first conductive part 113a and the piezoelectric element 112 according to the above-described embodiment of the present invention, the connection between the first conductive part 113a and the piezoelectric element 112 may be achieved by using other methods of connection. For example, the connection may be achieved by extending the first conductive part 113a and soldering the piezoelectric element 112 to the second metal part 115b of the first conductive part 113a.

The present application is based on Japanese Priority Application No. 2007-155272 filed on Jun. 12, 2007, with the Japanese Patent Office, the entire contents of which are hereby incorporated by reference.

What is claimed is:

1. An ultrasonic sensor having a piezoelectric element including first and second electrodes, the ultrasonic sensor comprising:

an aluminum case having a bottom part electrically contacting the second electrode of the piezoelectric element;

a conductive member formed of a cladding material including a first conductive part and a second conductive part welded to the aluminum case; and a lead wire having one end connected to one end of the first conductive part and another end connected to the first electrode of the piezoelectric element;

wherein the cladding material has one side formed of aluminum exhibiting a welding property with respect to the aluminum case and another side formed of nickel exhibiting a soldering property with respect to the lead wire;

wherein the cladding material is formed with a planar shape having a predetermined bent part of the cladding material positioned to be in close contact with the aluminum case.

2. The ultrasonic sensor as claimed in claim 1, wherein the first conductive part is formed of the same cladding material as the cladding material of the second conductive part.

* * * * *